United States Patent [19]

Büning et al.

[11] 4,247,436
[45] Jan. 27, 1981

[54] AQUEOUS SOLUTION OF MIXTURES OF SILICON-ORGANIC COMPOUNDS

[75] Inventors: Robert Büning, Troisdorf, Siegl; Horst Hanisch, Rheidt; Hansjürgen Hass; Karl-Martin Rödder, both of Troisdorf, Spich, all of Fed. Rep. of Germany

[73] Assignee: Dynamit Nobel Aktiengesellschaft, Troisdorf, Fed. Rep. of Germany

[21] Appl. No.: 69,692

[22] Filed: Aug. 27, 1979

Related U.S. Application Data

[60] Division of Ser. No. 814,807, Jul. 11, 1977, Pat. No. 4,195,141, which is a continuation-in-part of Ser. No. 802,219, May 31, 1977, abandoned.

[30] Foreign Application Priority Data

Jun. 3, 1976 [DE] Fed. Rep. of Germany ....... 2624888

[51] Int. Cl.³ .............................................. C08L 43/04
[52] U.S. Cl. .................................. 260/29.6 H; 156/329; 260/29.6 M; 260/29.6 E; 427/387
[58] Field of Search .................. 260/29.6 H, 29.6 M, 260/29.6 E; 427/387; 156/329

[56] References Cited

U.S. PATENT DOCUMENTS

| | | | |
|---|---|---|---|
| 2,977,334 | 3/1961 | Zopf et al. | 526/15 |
| 3,560,589 | 2/1971 | Sato et al. | 526/279 |
| 3,580,893 | 5/1971 | Heilman | 526/15 |
| 3,692,747 | 9/1972 | Domba | 526/15 |

OTHER PUBLICATIONS

Industrial and Engineering Chem., vol. 45, Feb. 1953, pp. 367–374, Bailey et al.
Lagally et al., I and EC Product Research & Development, vol. 5, No. 3, Sep. 1966, pp. 230–236.

*Primary Examiner*—Maurice J. Welsh
*Attorney, Agent, or Firm*—Sprung, Felfe, Horn, Lynch & Kramer

[57] ABSTRACT

An aqueous solution of a mixture of silicon-organic compounds comprising:

A. A silane of the general formula:

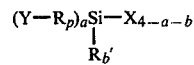

wherein a is 1 or 2, b is 0, 1 or 2, and a +b is equal to or less than 3, p is 0 or 1, and R represents an alkylene moiety of 1 to 8 carbon atoms or arylene moiety, R' represents an alkyl moiety, X represents a hydrolizable moiety and Y represents a functional group or the $CH_3$ or the $CH_2=CH$ moiety, and B. A copolymer having the recurrent unit of the general formula:

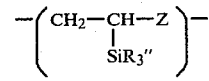

wherein R" represents OH and/or $[O]^-[NH_4]^+$ and/or $[O]^-[Me]^+$ where Me is an alkali or alkaline earth metal and Z can represent a moiety of the formula:

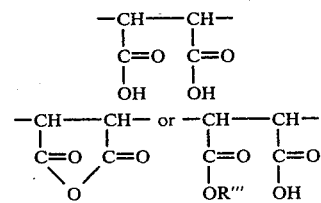

wherein R''' represents an alkyl moiety.

Also disclosed are new copolymers having the recurrent unit

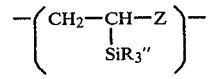

wherein at least one of the Z moieties is a moiety having the formula

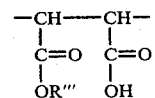

wherein R''' represents an alkyl moiety.

Also disclosed are the use of the aqueous solutions as coating agents for metals, inorganic oxidic and inorganic sulfidic materials. There is also disclosed the use of such aqueous solutions of silicon organic compounds as adhesivizing agents especially for securing inorganic oxidic materials to polymers.

13 Claims, No Drawings

AQUEOUS SOLUTION OF MIXTURES OF SILICON-ORGANIC COMPOUNDS

This is a division, of application Ser. No. 814,807, filed July 11, 1977, now U.S. Pat. No. 4,195,141, issued Mar. 25, 1980 which is a continuation-in-part of Ser. No. 802,219, filed May 31, 1977, now abandoned.

BACKGROUND OF THE INVENTION

1. Field of the Invention

This invention relates to aqueous solutions of silicon-organic compounds. More particularly, this invention relates to an aqueous solution of a mixture of organosilicon compounds useful as coating agents for metals or inorganic oxidic materials or plastics. More especially this invention relates to agents useful as adhesivizing agents for securing polymeric substances to inorganic oxidic materials. This invention is especially concerned with rendering inorganic oxidic materials, e.g., chalk water-repellent by disposing thereon a composition of organosilicon compounds.

2. Discussion of the Prior Art

It is known that organofunctional silanes are used as adhesivizing agents between inorganic-oxidic material and plastics. For many applications the strength of adhesion thereby obtained suffices. However, if the bond obtained is subjected to special stresses, the adhesion improvement obtained often proves to be insufficient.

Organofunctional silanes have also been used for the protection of the surface of inorganic-oxidic material and metals. Also known is the use of silicon-functional silanes such as, for example, alkyltrialkoxysilanes, in this field of application. It is possible with these silanes to modify the surface of the said materials, which also include inorganic pigments, in such a manner so as to improve free-flowing qualities, for example, by the use of certain silanes. However, the application of these silanes to a number of substrates involved difficulties. For instance, the fixing of these silanes to chalk or other carbonatic or sulfidic pigments is not possible.

Many of the silane coatings hitherto applied to inorganic oxidic material or metals also have the disadvantage that they are sticky, so that they do not provide free-flowing qualities. For the same reason the material has a great tendency to become lumpy. Coatings of aminosilanes are not sticky. These silanes, however, do not have an adequate ability to wet inorganic pigments or inorganic oxidic surfaces, so that they can be applied advantageously only from organic solutions if a uniform coating is to be obtained.

The problem accordingly existed of finding an agent based on silicon-organic compounds which will produce an adhesion between inorganic oxidic surfaces and polymers, and whose effect, even under severe stress in boiling water, for example, will diminish only slightly.

The problem furthermore existed of finding a substance with which coatings can be applied to inorganic pigments or metal surfaces and which will form on these surfaces a uniform and firmly adherent coating. This coating is furthermore to be hard, and must not be sticky.

It is an object of this invention, therefore, to provide a coating composition for inorganic oxidic materials, i.e., chalk, which improves the surface properties of the chalk and makes the same more compatible with systems in which the chalk is employed. It is a further object of this invention to render such materials at least slightly hydrophobic. It is a further object of this invention to provide an adhesivizing agent for inorganic oxidic materials and polymeric substances which is not substantially adversely affected when the bonded material is subjected to boiling in water over an extended period of time. It is a further object of this invention, therefore, to provide a coating agent for inorganic oxidic substances, inorganic sulfidic substances, metals and polymeric materials. It is especially an object of this invention to provide such a coating substance which is not sticky and adheres well to the coated substrate and has a good wetting ability.

These and other objects of this invention will become more apparent from the following description and claims.

SUMMARY OF THE INVENTION

Broadly this invention contemplates an aqueous solution or organosilicon compounds which solution contains:

A. A silane of the general formula:

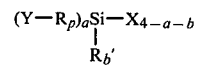

wherein $a=1$ or 2, $b=0$ or 1 or 2, and $a+b \leq 3$, and $p=0$ or 1, R represents an alkylene moiety of 1 to 8 carbon atoms or an phenylene moiety, R' represents an alkyl moiety of 1 to 4 carbon atoms or a phenyl moiety, X represents a hydrolyzable moiety, and Y represents a functional group or the $CH_3$ or the $CH_2=CH$ moiety, and B. Copolymers having recurrent units of the general formula

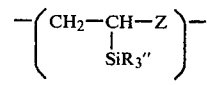

wherein R" represents OH and/or $[O]^-[NH_4]^+$ and/or $[O]^-[Me]^+$ (Me + alkali metal or alkaline earth metal) and Z can represent mainly a moiety of the formula

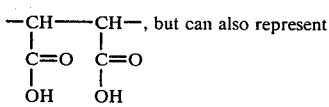, but can also represent the moieties 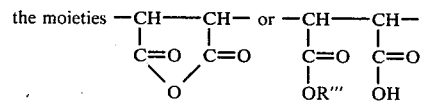

wherein R'" represents an alkyl moiety of 1 to 10 carbon atoms.

This invention further contemplates copolymers having the

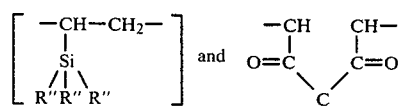

recurrent units wherein R" represents an alkoxy group with 1 to 8 C-atoms or an alkyl group with 1 to 4 C-atoms in which 50 to 100% of the

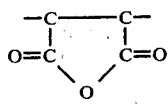

units are replaced by

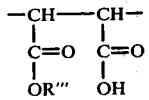

units,
wherein R''' represents an alkyl moiety of 0 to 10 carbon atoms. Generally speaking copolymers in the form of these half esters according to the invention have a molecular weight which has the same numerical dimension as the molecular weight of the known copolymers with the recurring

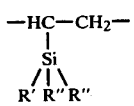

and

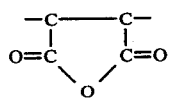

units, described in U.S. Pat. No. 3,560,589.

The copolymers of the invention are prepared by described at pages 33 of this specification.

It has been found in accordance with the invention that aqueous solutions containing the silanes and copolymers mentioned above do not suffer from the disadvantages of known silanes or suffer only to a far lesser extent. The adhesion between inorganic oxidic materials and polymers even under stress is improved so that the bond achieved with the aid of the mixture in accordance with the invention, even in boiling water, has strength values are more than 10% higher than provided when only one component is employed in the aqueous solution. The improved adhesivizing effect as thus produced is not only additive with respect to the individual components but in fact a synergistic effect is provided in that a mixture of silane and copolymer provides better effects than provided by an equivalent amount of either the silane alone or the copolymer alone.

With the aid of the solutions of the invention however, one can apply hard, non-sticky coatings to inorganic-oxide material or metals to form a uniform coating on these surfaces. Particularly surprising is the fact that for the first time with these solutions one can make chalk precipitated CaCo₃ water-repellent by means of silanes, so that the further processing of this material, in fillers, for example, is considerably improved.

In this field of application, too, the above-described synergism occurs. The mutual influence of the mixtures contained in the solution is independent of the silane that is used. Both organofunctional silanes and merely siliconfunctional silanes produce the above-stated effect with the copolymer described under (b). The nature of the functional group or of the hydrocarbon moiety at the silicon atom is of only secondary importance.

The silanes which are used for the preparation of the solutions of the invention correspond to the general formula

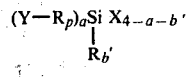

In this formula, a can assume values between 1 and 3, and b can assume values between 0 and 2, but a+b must be equal to or less than 3. This condition is essential to the invention, since at least one hydrolyzable moiety X must be present per molecule. This hydrolyzable moiety can be a halogen atom, preferably chlorine, or an alkoxy group, the alkyl moiety of the alkoxy group having 1 to 8 carbon atoms, preferably 1 to 4 carbon atoms, which can be interrupted in some cases by an oxygen atom. A part of the hydrolyzable moiety can be present in the aqueous solution also in the form of a silanol or silanolate moiety, depending on the pH value at which the solution is adjusted.

The symbol R in the formula for the silanes represents an alkylene moiety of 1 to 8, preferably 1 to 3, carbon atoms, or for an phenylene moiety. In some cases, this moiety can also be branched. In general, such a moiety is located only between the silicon atom and the functional group, so that the index p is then 1. The index p can be zero if the moiety Y represents the group CH₂=CH—, as in the vinyl trialkoxysilanes, for example.

The moiety Y represents a functional group or the methyl radical. In the latter case the silanes used are silicon-functional silanes in which there is at least one functional group (the hydrolyzable moiety X) and at least one alkyl moiety at the silicon atom.

The term "functional moiety," as used herein, is to be understood to refer not only to the group CH₂=CH— but also to any moiety which can enter known reactions with other functional groups. Examples of such moieties are amino, substituted amino, imino, mercapto, carbonyl, carboxy, isothiocyano moieties or a moiety containing epoxy groups.

Silanes which can be used in accordance with the invention are, for example, β-aminoethyltriethoxysilane, γ-aminopropyltrimethoxysilane, δ-aminobutyltrimethoxysilane, β-aminoethyl-γ-aminopropyltrimethoxysilane, α-methyl-β-aminoethyltriethoxysilane, N-dimethyl-γ-aminopropyltriethoxysilane, γ-glycidyloxypropyltrimethoxysilane, γ-glycidyloxypropyltributoxysilane, β-3,4-epoxycyclohexylethyltrimethoxysilane, γ-mercaptopropyltrimethoxysilane, β-mercaptoethyltriethoxysilane, γ-methacryloxypropyltrimethoxysilane.

From this enumeration it is apparent that even those compounds can be used as silanes containing amino groups in which one or both hydrogen atoms of the amino group can be replaced by a low alkyl moiety, preferably one having 1 to 4 carbon atoms, or by an aminoethyl moiety. In the case of the moieties containing epoxy groups, the epoxy group

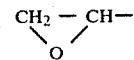

is bonded to the alkylene silyl moiety either by an ether—(—CH₂—O—) group or by an

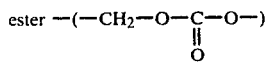

group.

The epoxy moiety can, alternatively, be bonded to the alkylene moiety directly or through a cycloaliphatic ring, or it can be a component of such a cycloaliphatic moiety. Generally the cycloaliphatic moiety is a C5 to C8 cycloalkane such as a cyclohexyl, cyclopentyl, 3-methylcyclopentyl group. The preparation of such silanes is described in U.S. Pat. No. 3,455,877, the disclosure of which is hereby incorporated herein specifically by reference. Generally speaking such silanes are prepared by reaction of organo-silicon-compounds having a —C=C— group, with per acids or by reaction of organo H-Silanes with unsaturated epoxides in presence of a catalyst or by reaction of organo-silicon-compounds having —OH—groups linked to the Si-atoms by a Si—C— linkage with epihalohydrin (oxacyclopropane-haloalkyls) (see DT-PS 1001321)

Copolymers useful in the present invention include both known and new copolymers. The known copolymers are those in which the moiety Z is derived from maleic acid anhydride and thus, the moiety Z has the maleic acid anhydride moiety of

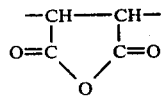

Such a copolymer itself has long been known. Such copolymers are prepared by the reaction of maleic anhydride with vinyltrialkoxysilane in the molar ratio of 1:1-3, in the presence of radical-forming catalysts, at temperatures between 120° C. and 160° C. Organic peroxides serve mainly as the radical-forming catalysts, such as, for example, benzoyl peroxide, di-tert.-butyl peroxide, or dicumyl peroxide (cf. Ind. & Eng. Chem. 45 (1953) No. 2, pp. 367 to 374).

In accordance with this invention copolymers can be employed wherein Z has the half ester moiety of

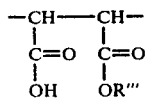

Such a polymer can be prepared by contacting a copolymer wherein Z is a maleic acid anhydride moiety of the formula

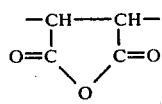

with an alcohol thereby causing dissolution of the copolymer in the alcohol. Suitable alcohols for this include the alkanols especially those having 1 to 20 carbon atoms, more especially those having 1 to 8 carbon atoms. The moiety R''' then corresponds to the alkyl moiety of the alcohol employed as solvent.

It is to be understood that the copolymers employed in the aqueous solution include copolymers wherein all Z moieties correspond to the half ester moiety or, alternatively, all Z moieties correspond to a hydrolyzed form thereof having the formula

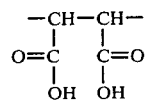

Generally, the copolymers employed will have a mixture of Z moieties corresponding to the three formulae stated.

Preferably, however, these polymers are suitable for the preparation of the aqueous solutions in which the moiety Z of the above-given formula consists mainly of the moieties

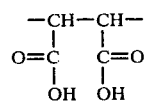

Copolymers having principally this structural unit can be prepared by adding water to the solution of the known copolymer, which is formed by the reaction of vinyltrialkoxysilanes with maleic acid anhydride, to precipitate a compound which is insoluble in water and in which the structural units are composed principally according to the following formulas:

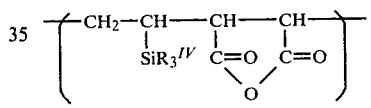

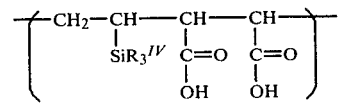

in which $R^{IV}$ represents either OH groups or an oxygen bridge to another structural unit, so that this insoluble compound contains silanol and siloxane units in addition to the maleic acid and maleic acid anhydride units.

The siloxane units of the copolymer that is insoluble in water (by which the cross-linking of the individual structure units to one another is performed) can easily be decomposed by dilute alkalies, thereby making the copolymer water-soluble again and giving it the structural units cited above.

Aqueous ammonia solutions are used preferentially as alkalies, and their NH₃ content can vary widely according to the pH range in which the solution obtained is to be used. In general, however, 0.5 to 5% solutions of ammonia in water suffice to prepare 15 to 20% aqueous solutions of the copolymer. In these solutions, the siliceous moiety is either a silanol or silanolate moiety corresponding to the ideal formula

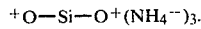

Instead of aqueous ammonia solutions, other aqueous, basically reacting solutions can be used for the cleavage of the siloxane bond in the water-insoluble copolymer and therefore for the preparation of the solution in accordance with the invention. Examples that can be given are alkali or alkaline earth hydroxide solutions, quaternary ammonium compounds or water-soluble amines, such as for example n-amylamine, di-n-propylamine, triethylamine, ethanolamine, diethanolamine, triethanolamine or tetraalkyl ammonium hydroxides whose alkyl group contains 1 to 3 carbon atoms.

For the preparation of the solutions in accordance with the invention, the solutions of the water-insoluble copolymer containing the siloxane and maleic acid or maleic acid anhydride units are mixed with the silanes. The silanes can be used in substance, although aqueous solutions or solutions of the silanes in a solvent (e.g., ethanol) which is miscible with water can be mixed with the copolymer solution.

Since the copolymer solution has a pH above 7, stable, alkaline-reacting solutions are obtained by this method of preparation. The claimed solutions, however, are also stable in the weakly acid range at room temperature, so that it is possible through the addition of dilute acid to establish any desired pH value above 3 without substantially altering the composition of the solutions of the invention. At pH values lower than 3, depending on the concentration selected, crosslinking can already take place, which is also possible at pH values between 3 and 6 when concentrated solutions are stored in this pH range for a relatively long time. In general, therefore, a desired pH value is established after the two components of the mixture are combined; it is also possible, however, to adjust one or both components to a desired pH value before they are mixed together, and then to perform the mixing.

The concentration of the individual components in the solution can vary within wide limits. The copolymers are contained in the solution in a percentage of 0.001 to 50%, preferably between 0.01 and 20%, by weight. The silane component can be present in a percentage of 0.001 to 80%, preferably of 0.01 to 60%, by weight.

The ratio of silane to copolymer can also be whatever ratio is desired. The synergetic action takes place in any desired ratio of admixture. It is recommendable, however, that one of the two components amount to at least 2% of the weight of the dissolved silicon-organic compounds. Generally speaking, the weight ratio of silicon to copolymer is 1:10 to 10:1, preferably 4,5:10 to 10:4,5.

Aqueous solutions, in accordance with the invention, shall also be those solutions which additionally contain still other organic solvents which are miscible with water, the content of the additionally present solvent being able to be greater than the water content. The ratio of the organic solvent to water, however, should not exceed 2:1. A preferred additionally present solvent is ethanol.

As stated above, the solutions of the invention are suitable for the preparation of coatings on inorganic surfaces and for use as adhesivizing agents between organic polymers and inorganic-oxidic or inorganic-sulfidic surfaces.

The inorganic materials on which the solutions of the invention produce firmly adherent, scratch-resistant coatings include metals, such as iron, zinc, aluminum, magnesium, copper, and alloys of these metals with one another or with other metals.

The term, "inorganic-oxidic substances," as used with reference to the invention, is to be understood to mean those solid substances which contain bound oxygen in any form, such as, for example, metal oxides, mixed oxides, carbonates, sulfates, silicates, and phosphates. Examples of such substances are aluminum oxide, kaolin, clay, bauxite, silicon dioxide, sand, titanium dioxide, zinc oxide, iron oxide, chromium oxide, manganese dioxide, calcium oxide, calcium carbonate, gypsum, barite, chalk, and glass in all its forms, such as filaments, fibers, spheres and sheets.

Coatings can be applied also to sulfidic materials with the solutions of the invention. These substances comprise mainly metal sulfides as they occur in nature as minerals, or as synthetic substances used mainly as pigments. Examples are molybdenum sulfide, cadmium sulfide and antimony sulfide.

To make coatings with the solutions of the invention, the latter are used preferably in the form of 0.5 to 10% solutions, by weight. These solutions are applied by known methods to the degreased surfaces, for example by dipping, spraying, or brushing. Then the solvent is removed by evaporation. This can be done either at room temperature or at elevated temperatures of up to about 200° C.

When the solutions in accordance with the invention are used as adhesivizing agents, they are applied to the substrate in a similar manner. For this purpose, however, solutions having a content of as little as 0.05 to 2%, by weight, of the silicon-organic compounds will suffice.

When the solution in accordance with the invention is used as an adhesivizing agent for polymers, it can also be admixed with the polymer and this mixture can be bonded to the inorganic-oxidic material in a known manner. In this case it is preferable to use 0.5 to 5% solutions.

The polymers which are bonded with the aid of the solutions of the invention to inorganic-oxidic material or to metals include both thermosets and thermoplastics. Examples of thermosets are epoxy resins, phenolic resins, and unsaturated polyester resins. Examples of thermoplastics are polyolefins, polyamides, polycarbonates, polyesters such as polytetramethyleneglycolphthalate, and polystyrene and polyvinyl chloride.

In order to more fully illustrate the nature of the invention and the manner of practicing the same the following examples are presented.

EXAMPLES

EXAMPLE 1

In a three-necked flask provided with stirrer, introduction tube for nitrogen and a reflux condenser with a calcium chloride tube, 147 g of maleic acid anhydride was dissolved, with stirring and the introduction of nitrogen, in 510 g of vinyltriethoxysilane at 70° C. After dissolution had taken place, 3.9 g of dicumyl peroxide was added to it and the temperature was increased to 130° C. At that temperature the reaction began. The polymerization heat was carried away by cooling so that the temperature in the flask was between 130° and 150° C. After the reaction dies out, stirring was continued for three more hours at 130° C. and the reaction was stopped.

The excess vinyltriethoxysilane was first removed in a water-jet vacuum at 60° C. and then at a temperature increasing up to 130° C. The residual monomer was removed by an oil pump vacuum (0.1 mm Hg). 480 g of a solid, slightly yellowish resin was obtained. The ratio of vinyltriethoxy units to maleic acid anhydride units in this product was greater than 1--approximately 1.1

The copolymer was then dissolved at 76° C. in 500 ccm of absolute ethanol. Then the ethanolic solution was added, drop by drop, with vigorous stirring, to 5 liters of desalted water, a fine, white powder settling out in a yield of 350 g. The powder was isolated from the aqueous phase by filtration or centrifugation followed by washing, and was dried in a circulating air drying oven at 50° C. It was a copolymer with maleic acid ester, maleic acid monoester and maleic acid anhydride units, plus vinylsilanol and vinylsiloxane units.

EXAMPLE 2

A portion of the solid, white copolymer of Example 1 was stirred at room temperature into 9 parts of a 1% aqueous ammonia solution. In the course of 24 hours a clear solution was obtained.

EXAMPLE 3

2 parts of isobutyltrimethoxysilane were dissolved in 98 parts of a solution of 60 parts of ethanol and 40 parts of demineralized water. 5 ml of this silane solution was placed on a glass sheet measuring 10×15 cm. The plate was let stand at room temperature while the solvent evaporated. For comparison, glass sheets were treated with 2% alcoholic solutions of the following silanes:
Vinyltrimethoxysilane
γ-chloropropyltrimethoxysilane
γ-aminopropyltriethoxysilane
γ-methacryloxypropyltrimethoxysilane
γ-glycidyloxypropyltrimethoxysilane and
with the solution described in Example 2, which was thinned to a content of 2% of solids by the addition of demineralized water. The results are summarized in Table 1. Solutions were furthermore prepared from the above-named silanes and the copolymer of Example 2, containing 98 parts of a solvent mixture composed of 60 parts ethanol and 40 parts demineralized water, and one part each of the silane and copolymer. These solutions were applied to glass sheets like the solutions used for comparison. The following Table 1 shows the result of the tests. A judgment was made of the wetting of the glass sheet by the silane solution and of the adhesion and surface quality of the film that formed after evaporation of the solvent.

TABLE 1

| | Wetting action | Adhesion | Surface quality |
|---|---|---|---|
| Isobutyltrimethoxysilane | poor | poor | soft, sticky |
| Vinyltrimethoxysilane | poor | good | hard, not sticky |
| γ-chloropropyltrimethoxysilane | poor | good | soft, sticky |
| γ-aminopropyltriethoxysilane | poor | very good | hard, not sticky |
| γ-methacryloxypropyltrimethoxysilane | poor | poor | soft, sticky |
| γ-glycidyloxypropyltrimethoxysilane | good | poor | sticky |
| Copolymer of Example 2 | very good | moderately good | hard, not sticky |
| Isobutyltrimethoxysilane and copolymer of Example 2 | very good | very good | hard, not sticky |
| Vinyltrimethoxysilane and copolymer of Example 2 | very good | very good | hard, not sticky |
| γ-chloropropyltrimethoxysilane and copolymer of Example 2 | very good | good | hard, not sticky |
| γ-aminopropyltrimethoxysilane and copolymer of Example 2 | good | good | hard, not sticky |
| γ-methacryloxypropyltrimethoxysilane and copolymer of Ex. 2 | good | good | hard, not sticky |
| γ-glycidyloxypropyltrimethoxysilane and copolymer of Ex. 2 | good | good | hard, not sticky |

EXAMPLE 4

A 10% solution prepared in accordance with Example 2 from the copolymer of Example 1 was diluted with demineralized water to an 0.25% solution. Strands of water-slashed glass fibers were immersed in this solution and then dried, first at room temperature, and then at 120° C. The glass fiber strands thus pretreated were then fabricated to form glass fiber-reinforced round epoxy resin and unsaturated polyester resin rods by immersion, in the one case, into an epoxy resin mixture consisting of 55.2 parts of Araldit FRL epoxy resin, 44.2 parts of HT 907 amine hardener and 0.6 parts of DY 061 accelerator (all products manufactured by Ciba-Geigy AG, Basel) and, in the other case, into an unsaturated polyester resin (Palatal P6 of BASF, Ludwigshafen) to which 2 wt.-% of dibenzoyl peroxide had been added. The hardening of the rods was performed at 130° C. (epoxy resin) and 100° C. (polyester resin) over a period totaling 17 hours (two hours setting time, 15 hours curing time). Then the bending strength of these rods was determined without the action of moisture and after 72 hours of immersion in boiling water.

In like manner, glass fiber-reinforced round rods were made with the use of 0.25% aqueous solutions of the adhesivizing agents 2 to 5, and their bending strength was measured. The solutions were prepared by incorporating 0.25% aqueous solutions of the adhesivizing agent in the stated ratio. The results of the measurements are set forth in Table 2. In this table the adhesivizing agents are designated as follows:
Adhesivizer 1: Copolymer of Example 2
Adhesivizer 2: γ-aminopropyltriethoxysilane
Adhesivizer 3: Mixture of 1 part Adhesivizer 1 and 1 part Adhesivizer 2
Adhesivizer 4: γ-methacryloxypropyltrimethoxysilane
Adhesivizer 5: Mixture of 1 part Adhesivizer 1 and 9 parts Adhesivizer 4

TABLE 2

| Adhesivizer | Resin | Strength (kp/cm$^2$) Bending Dry | 72 h boiling water |
|---|---|---|---|
| 1 | Epoxy | 10,400 | 6,100 |
| 2 | Epoxy | 11,400 | 8,700 |
| 3 | Epoxy | 11,700 | 9,700 |
| 1 | UP* | 8,700 | 2,100 |
| 4 | UP* | 12,300 | 6,500 |
| 5 | UP* | 12,300 | 7,400 |

*UP = Unsaturated polyester

EXAMPLE 5

Glass fiber-reinforced round epoxy resin rods were prepared as in Example 4, using 0.25% aqueous solutions of adhesivizers as defined below:
Adhesivizer 1: γ-aminopropyltriethoxysilane
Adhesivizer 2: Copolymer of Example 2
Adhesivizer 3: Mixture of 9 parts Adhesivizer 1 and one part of Adhesivizer 2

Adhesivizer 4: Mixture of 7 parts Adhesivizer 1 and 3 parts Adhesivizer 2

Adhesivizer 5: Mixture of 5 parts Adhesivizer 1 and 5 parts Adhesivizer 2

Adhesivizer 6: Mixture of 3 parts Adhesivizer 1 and 7 parts Adhesivizer 2

Adhesivizer 7: Mixture of 1 part Adhesivizer 1 and 9 parts Adhesivizer 2

The following bending strength values were measured:

| Adhesivizer | Bending Dry | Strength (in kp/cm$^2$) After 72 h in boiling water |
|---|---|---|
| 1 | 11,400 | 8,700 |
| 2 | 10,400 | 6,100 |
| 3 | 10,200 | 9,400 |
| 4 | 10,600 | 9,500 |
| 5 | 11,700 | 9,700 |
| 6 | 11,700 | 9,700 |
| 7 | 10,600 | 9,300 |

Example 6

Glass fiber-reinforced round epoxy resin rods were prepared as in Example 4, using an 0.25% solution of a mixture of one part copolymer of Example 2 and 1 part of γ-aminopropyltrimethoxysilane. The glass fiber strands in this case were dipped either into the freshly prepared solution in the one case or, in the case of a second specimen, not until 48 hours after the adhesivizing solution had been prepared. The bending strengths achieved are shown in Table 3. They show that the solutions in accordance with the invention lose their effectiveness not at all or only slightly after relatively long standing time.

TABLE 3

| Standing time of γ-aminopropyl trimethoxysilane-copolymer solution in hours | Bending Dry | strength (kp/cm$^2$) After 72 h in boiling water |
|---|---|---|
| 0 | 9,300 | 8,900 |
| 48 | 10,900 | 8,400 |

Example 7

Glass fiber-reinforced round unsaturated polyester resin rods were prepared as in Example 4, using an adhesivizing agent composed of an 0.25% aqueous γ-methacryloxypropyltrimethoxysilane solution of pH 4 and an 0.25% aqueous solution of a copolymer prepared as in Example 2. The glass fiber strands were dipped either into the freshly prepared solution or, in the case of a second specimen, into the solution 48 hours after its preparation. The pH of the adhesivizer solutions was adjusted with acetic acid to the level given in Table 4. The bending strength values given in Table 4 were obtained with these rods.

TABLE 4

| Standing time of adhesivizer solution in h | pH of γ-methacryloxy-propyltrimethoxysilane-copolymer sol. | Bending Dry | str. (kp/cm$^2$) After 72 h in boiling water |
|---|---|---|---|
| 0 | 4 | 11,500 | 4,200 |
| 48 | 4 | 11,400 | 4,900 |
| 0 | 5 | 11,600 | 5,200 |
| 48 | 5 | 11,600 | 5,800 |
| 0 | 6 | 11,600 | 5,400 |
| 48 | 6 | 11,500 | 5,500 |

The table shows that in this case, again, if the solution in accordance with the invention is let stand for a long time, its adhesivizing action is virtually undiminished. Furthermore, when the solutions in accordance with the invention contain methacryloxyalkyltrialkoxysilanes as silane components, and they are used for the improvement of adhesion between thermosets and inorganic-oxidic substances, it is recommendable that the solution be used in a pH range between 4 and 6.

Example 8

0.5 parts of propyltrimethoxysilane in the form of a 10% solution in water and alcohol in a 1:1 ratio were applied to 100 parts of chalk (Omya chalk, Millicarb type) with intense mixing in a Braun Model MX 32 high-speed mixer. Then the chalk thus pretreated was dried for 1½ hours at 150° C. (Specimen 1).

In like manner, 100 parts of chalk were pre-treated with ½ part of the copolymer of Example 2 (Specimen 2), and with a mixture of ½ part of propyltrimethoxysilane and ½ part of the copolymer of Example 2 (Specimen 3).

The water-repellency of the chalk can be measured on the basis of its wettability by water. Two tests were performed for this purpose:

1. With the bottom of a test tube a cavity was impressed in a sample of chalk, and a 5-mm water drop was placed therein. In the case of chalk not treated for water-repellency, the drop was immediately absorbed, and in the case of the treated chalk the drop lowly evaporated in the air.

2. A small amount of chalk was sprinkled on water. The untreated chalk, for chalk which had not been rendered water-repellent, sank immediately; water-repellent chalk floated on the surface for at least 24 h.

| | Chalk Specimen | Wetting by Water | |
|---|---|---|---|
| | | Water drop test | Sinking test |
| 0 | Untreated chalk | Absorbed at once | Sinks at once |
| 1 | Chalk treated with propyltrimethoxysilane | Absorbed at once | Sinks at once |
| 2 | Chalk treated with copolymer of Example 1 | absorbed at once | Sinks at once |
| 3 | Chalk treated with mixture of propyl-trimethoxysilane and copolymer of Example 1 | Slowly evaporates in the air | Remains on surface for at least 24 h |

VINYLTRIALKOXY SILANE/MALEIC ACID ESTER COPOLYMERS

The subject matter of the present invention are copolymers having

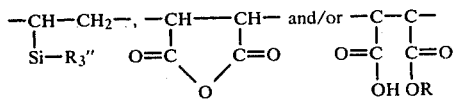

radicals, wherein R represents hydrocarbon radicals having 1 to 20 carbon atoms, especially alkyl, alkenyl, alkynyl, cycloaliphatic including cycloalkyl and cycloalkenyl. These products are valuable intermediate products for the production of reactive silyl compounds which are used as adhesivizers, coating materials or as filtering aids. R" represents an alkoxy group with 1 to 8 C-atoms or an alkyl group with 1 to 4 C-atoms.

Copolymers of vinyl trialkoxy silanes and maleic acid anhydride are already known, which are produced through polymerization of vinyltrialkoxy silanes and maleic acid anhydride in the presence of organic peroxides at temperatures between 90° and 150° C. The alkoxy group of the vinyl trialkoxy silane can have 1 to 8 carbon atoms and, if necessary, be interrupted by an oxygen bridge bond such as, for instance, in the vinyl-tris-(β-methoxyethoxy)-silane. One of the alkoxy groups can also be substituted with a hydroxy or alkyl group having 1 to 4 carbon atoms or with the phenyl radical.

The preparation of these copolymers is known per se and is described in U.S. Pat. No. 3,560,589, for instance. According to statements in this patent, these copolymers are suitable as adhesive agents between epoxy resins and inorganic filler.

It has now been found that the semi-esters derived from these copolymers possess new, unexpected properties which the known copolymers do not possess or have only to a hitherto unknown, small extent. These semi-esters can be further hydrolyzed into hitherto unknown hydrolysates which are, among others, used in the same fields of application as the semi-esters.

The semi-esters of vinyl alkoxy silane/maleic acid copolymers are characterized by the units already mentioned above. The radical containing the silyl group is either linked to a maleic acid anhydride radical or a maleic acid semi-ester radical. The two remaining bonds of the silyl radical are either both connected to an alkoxy radical having 1 to 8 carbon atoms or only one of the remaining valences of the Si atom is linked with such a radical, whereas one or both other free valences of the Si atom are linked with an alkyl radical having 1 to 4 carbon atoms or with a hydroxyl group or with a phenyl radical. The free valences of the silicon are therefore linked to the same radical as the vinylalkoxy silane/maleic acid anhydride copolymer used as starting material.

In the new semi-ester copolymers the proportion of the maleic acid semi-ester units is larger than that of the maleic acid anhydride units. When the reaction is properly conducted, it is also possible that the maleic acid anhydride proportion becomes virtually zero.

The individual copolymer units vary in irregular sequence in the copolymer chain. The total of the maleic acid anhydride and maleic acid semi-ester units is maximally just as big as the vinyl alkoxy silane units. In general, the excess of the vinyl alkoxy silane units amounts to 0.1 to 10%. However, it is also possible to allow the excess to become larger if a suitable excess of vinyl alkoxy silanes was used during the preparation of the vinyl alkoxy silane/maleic acid anhydride copolymers used as starting material.

The production of the new vinyl alkoxy silane/maleic acid semi-ester copolymers takes place in a manner known per se by esterification of the maleic acid anhydride component of the vinyl alkoxy silane/maleic acid anhydride copolymers. The esterification takes place at temperatures between 40° and 150° C., preferably between 60° and 110° C. The longer the heating is conducted, the higher is the degree of esterification. The degree of esterification can also be increased by increasing the temperature and especially by the addition of catalysts, e.g., sulfonic acids.

If the alcohol to be esterified is liquid, the esterification takes place desirably under reflux long enough until no more reflux appears. Subsequently, one can continue to heat if necessary at elevated temperatures and pressure.

The esterification takes place with saturated as well as also with unsaturated or cycloaliphatic alcohols. The chain length of the alcohol can amount to up to 20 carbon atoms. Examples reusable alcohols are methanol alcohol, ethyl alcohol, octyl alcohol, 2-ethyl-hexyl-1-alcohol, cetyl alcohol, allyl alcohol, crotyl alcohol or cyclohexyl alcohol.

The new vinyl alkoxy silane/maleic acid semi-ester copolymers are used in the conditioning of sewage sludges by adding to the sludge fillers treated therewith, together with polyelectrolytes, e.g., polyacrylamides or polyethylene imine derivatives. The thus treated sludge can be filtered better and its flocculation is more stable than when an untreated filler or one treated with a known silane is added.

The new semi-ester copolymers or their hydrolysis products can also be used as adhesivizers together with silanes known per se. This field of application is more clearly described above. The moistening effect of such a mixture vis-a-vis inorganic pigments is larger than that of the individual substances so that a synergistic effect exists here. With such a mixture even chalk can be provided with an adhesive layer so that the further processing of this material, for instance as filler in organic polymers, is substantially improved by the treatment with such a composition. Hitherto this had not been possible with the silanizing agents known until now.

The new vinyl alkoxy silane/maleic acid semi-ester copolymers are soluble in organic solvents such as alcohols or ketones (e.g., acetone). They react with water while forming on hydrolysates, the alkoxy groups of the silyl units being split into hydroxyl groups, and cross-link in such a case while forming Si—O—Si—bond with an additional silyl unit into siloxanes. During the hydrolysis the maleic acid semi-esters and anhydride units react fully or partially with formation of maleic acid units of the formula

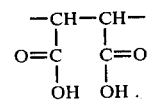

These hydrolysates are soluble in diluted alkalis. As soon as the dissolution occured, these solutions can also be diluted with water without a condensate again precipitating. A dilution with weak acids is also possible after resulting dissolution.

The mentioned hydrolysates can be used in the same fields of application as the vinyl alkoxy/maleic acid semi-ester copolymers.

EXAMPLE 1

Preparation of vinylalkoxy silane/maleic acid anhydride copolymers.

In a three-necked flask provided with stirrer, introduction tube for nitrogen and a reflux condenser with a calcium chloride tube, 147 g maleic acid anhydride (1.5 mol) was dissolved, with stirring and the introduction of nitrogen, in 510 g vinyltriethoxy silane (2.7 mol) at 70° C. After dissolution had taken place, 3.9 g of dicumyl peroxide are added to the starting composition and the temperature is increased to 130° C. At that temperature the reaction begins. The polymerization heat is carried away by cooling. Here the temperature range is to be between 130° to 150° C. After the reaction dies out, stirring is continued for three additional hours at 130° C. and the reaction is stopped.

The excess vinyltriethoxy silane is first removed in a water-jet vacuum at 60° C. with increasing temperature up to 130° C. The residual monomer is removed by an oil pump vacuum (0.1 mm Hg). 480 g of a solid, slightly yellowish resin are obtained. The theoretic yield with a strongly alternating copolymer would amount to 432 g. The copolymer contains vinyltrialkoxy units having a number larger than 1. This is brought about by the use of an excess of vinyltriethoxy silane which is required to obtain a complete copolymerization of the maleic anhydride. This is again required because it is difficult to remove residual monomeric maleic anhydride and it can cause interruptions. The copolymer has a softening point of 75° C.

EXAMPLE 2

288 g of a vinyltriethoxy silane/maleic acid anhydride copolymer prepared according to Example 1 are heated with 46.07 g ethyl alcohol for eight hours with stirring. At first the temperature was kept at 80° C. until the liquid portion of the ethyl alcohol had reacted fully, i.e., there was no more reflux. Then it was heated to 100° C.

The solidification point of the product obtained was determined and an IR spectrum was recorded. There the behavior the extinctions of the $(C=O)_{esters}$ to the assymetric $(C=O)_{anhydride}$ valence vibration $(E_E/E_A)$ was determined, which is a measure of the esterification degree.

At 20° C. the semi-ester obtained was light yellowish and very viscous. Its solidifation paint was $-22.5°$ C. $E_E/E_A=1.10$; mol % of the anhydride functions: $\sim 31$, corresponding to 69 mol % of semi-ester.

Elementary analysis: Theory: C:50.29; H:7.78; O:33.53; Si:8.38. Found: C:49.06; H:7.69; O: -; Si:8.91.

EXAMPLE 3

288 g of a vinyltriethoxy silane/maleic acid anhydride copolymer prepared according to Example 1 are stirred with 58.8 g allyl alcohol for eight hours at 60° C. The polymer obtained was at 20° C. a homogeneous, light-yellow viscous melt whose solidifcation point lay at $-16°$ C. $E_E/E_A=0.88$; mol % of the anhydride functions: $\sim 36$.

Elementary analysis: Theory: C:52.02; H:7.51; O:32.37; Si:8.09. Found: C:50.73; H:7.45; O: -; Si:8.67.

EXAMPLE 4

Example 3 was repeated except that the reaction temperature was kept at 100° C. At the start of the reaction the allyl alcohol boiled with reflux. The other reaction conditions were the same as in Example 3.

The obtained polymer had a solidification point of $-45°$ C., its $E_E/E_A$ value lay at 1.11, so that the proportion of the anhydride functions lay at around 31 mol %.

Elementary analysis: Found: C:50.67; H:7.78; Si:8.51.

EXAMPLE 5

Under the reaction conditions of Example 4, 288 g of vinyltriethoxy silane/maleic acid anhydride copolymer (prepared according to Example 1) were reacted with 242 g cetyl alcohol. The polymer obtained was a homogeneous, light-yellow melt having a solidification point of $+15.4°$ C. $E_E/E_A=1.25$; mol % of the anhydride functions: $\sim 29$.

Elementary analysis: Theory: C:63.4; H:10.19; O:21.13; Si:5.28. Found: C:63.88; H:10.54; O: -; Si:5.67.

EXAMPLE 6

Example 5 was repeated except that the reaction mixture was additionally heated with 0.46 g toluene sulfonic acid for 24 hours to 100° C. The coagulation point of the polymer obtained lay at $+13°$ C., its $E_E/E_A$ value was 3.45, so that the proportion of the anhydride function was at 13 mol %.

EXAMPLE 7

Similar to Example 5, 288 g vinyltriethoxy silane/maleic acid anhydride copolymer were reacted for eight hours with 130.2 g 2-ethylhexanol-1 at 100° C. The obtained product had a coagulation point of $-41°$ C. and a proportion of anhydride functions of about 28 mol % ($E_E/E_A=1.31$).

Elementary analysis: Theory: C:57.41; H:9.09; O:26.79; Si:6.70. Found: C:56.76; H:9.32; O: -; Si:7.13.

EXAMPLE 8

Similar to Example 5, 288 g vinyltriethoxy silane/maleic acid anhydride copolymer were heated with 72 g butanol at 100° C. for eight hours. The polymer obtained had a solidification point of $-14.5°$ C. and a proportion of anhydride functions of about 27 mol % ($E_E/E_A=1.38$).

Elementary analysis: Theory: C:53.05; H:8.28; O:30.93; Si:7.73. Found: C:51.41; H:8.47; O: -; Si:8.46.

EXAMPLE 9

300 g of a vinyltriethoxy silane/maleic acid anhydride/maleic acid semi-ester copolymer prepared according to Example 2 were dissolved in about 300 ccm ethanol. The obtained solution was added dropwise with vigorous stirring into 3 liter desalted water. A fine white deposit resulted.

The condensate can be easily isolated by filtering or centrifuging with subsequent washing from the aqueous phase. Then one dried in the drying oven with circulating air at 50° C. There was obtained a white powder with a yield of 220 g.

The powder obtained represents a copolyer with maleic anhydride maleic acid and vinyl silanol or vinyl siloxane (due to crosslinking)-units. The siloxane units can easily be split by diluted alkalines, e.g., 1% aqueous ammonia solution, dissolution taking place. The hydrolysate of the new vinyl alkoxysilane/maleic acid-/maleic acid semi-ester copolymers therefore contain in the dissolved state vinyl silanol units in addition to the maleic acid units. During film formation or in the precipitation during the hydrolysis—these vinyl silanol units change partially—according to pH value—to vinyl siloxane units.

Similar results are obtained if in the preparation of the vinyl alkoxy silane/maleic acid anhydride copolymers according to Example 1 there are used as starting components, instead of vinyltriethoxy silane, other vinylalkoxy silanes, e.g., vinyl trimethoxy silane or vinyl tributoxy silane or vinyl methyldiethoxy silane. The resulting copolymers are then esterified and/or hydrolyzed in similar manner.

What is claimed is:

1. An aqueous solution of organosilicon compounds comprising water; and

A. a silane of the general formula $$(Y-R_p)_a Si\underset{R_b'}{X_{3-a-b}},$$

wherein a is 1 or 2, b is 0 or 1 or 2, p is 0 or 1 and a+b is equal to or less than 3, R represents the alkylene moiety of 1 to 8 carbon atoms or an arylene moiety, R' represents an alkyl moiety of 1 to 4 carbon atoms or a phenyl moiety, X represents a hydrolyzable moiety, and Y represents a functional group with a $CH_3$ or $CH_2=CH-$ moiety, and B. a copolymer having a recurrent unit of the formula $$-\left(\begin{array}{c}CH_2-CH-Z\\ |\\ SiR_3''\end{array}\right)-$$

wherein R'' represent OH and/or $[O]^-[NH_4]^+$ and/or $[O]^-[Me]^+$ wherein Me is an alkali or alkaline earth metal and Z represents at least one moiety of the formula $$\begin{array}{cc}-CH-\!\!-\!\!-CH-\\ |\quad\quad\quad|\\ C=O\quad C=O\\ |\quad\quad\quad|\\ OH\quad\quad OH\end{array}$$

$$\begin{array}{cc}-CH-\!\!-\!\!-CH-\text{ or }-CH-\!\!-\!\!-CH-\\ |\quad\quad\quad|\quad\quad\quad\quad\quad|\quad\quad\quad|\\ C=O\quad C=O\quad\quad\quad C=O\quad C=O\\ \backslash\quad/\quad\quad\quad\quad\quad|\quad\quad\quad|\\ O\quad\quad\quad\quad\quad\quad OR'''\quad OH\end{array}$$

wherein R''' represents and alkyl moiety of 1 to 20 carbon atoms.

2. An aqueous solution according to claim 1 wherein said silane is present in an amount between 0.001 and 60 weight percent.

3. An aqueous solution according to claim 2 wherein said silane is present in an amount of 0.01 to 30 weight percent.

4. An aqueous solution according to claim 1 wherein said copolymer is present in an amount between 0.001 and 20 weight percent.

5. An aqueous solution according to claim 4 wherein said copolymer is present in an amount between 0.01 and 10 weight percent.

6. An aqueous solution according to claim 2 wherein said copolymer is present in an amount between 0.001 and 20 weight percent.

7. An aqueous solution according to claim 1 containing a water miscible organic solvent.

8. A method of preparing an aqueous solution of claim 1 which comprises forming a copolymer by reacting a vinyltrialkoxysilane with maleic acid anhydride, dissolving the same in alcohol, adding water thereto whereby to form a precipitate, dissolving the precipitate in an aqueous alkaline medium and admixing the resultant solution with an organosilane of the formula $$(Y-R_p)_a Si\underset{R_b'}{X_{3-a-b'}}$$

wherein Y, R, X, R', p, a and b have the meanings given in claim 1.

9. A method according to claim 8 wherein the aqueous alkaline medium is ammoniacal alkaline medium.

10. A method according to claim 8 wherein the copolymer which is mixed with the silane is mixed in the form of an aqueous solution or as a solution in an organic solvent miscible with water.

11. A method of coating a metal, inorganic oxidic substance or inorganic sulfidic substance with a silane which comprises contacting the metal, inorganic oxidic substance or inorganic sulfidic substance with an aqueous solution of claim 1 and thereafter removing the water and any other solvent therefrom.

12. A method according to claim 11 wherein the substance which is coated is chalk or calcium carbonate.

13. A method of securing an inorganic polymeric substance to a metal, inorganic oxidic substance or inorganic sulfidic substance which comprises disposing between said organic polymer and said metal, inorganic oxidic substance or inorganic sulfidic substance the solution of claim 1 and removing the water and any solvent therefrom.

* * * * *